US008882176B2

(12) United States Patent
Froling et al.

(10) Patent No.: US 8,882,176 B2
(45) Date of Patent: Nov. 11, 2014

(54) ACTIVE AERO DIFFUSER

(71) Applicant: GM Global Technology Operations LLC, Detroit, MI (US)

(72) Inventors: Thomas H. Froling, Beverly Hills, MI (US); Joel P. Ruschman, Birmingham, MI (US); Joshua L. Thurter, Macomb, MI (US); Chris Piscitelli, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 21 days.

(21) Appl. No.: 13/647,478

(22) Filed: Oct. 9, 2012

(65) Prior Publication Data

US 2014/0097638 A1    Apr. 10, 2014

(51) Int. Cl.
*B62D 35/02* (2006.01)
(52) U.S. Cl.
USPC ...................................................... 296/180.1
(58) Field of Classification Search
USPC ................... 296/180.1, 180.2, 146.8, 180.5
See application file for complete search history.

(56) References Cited

U.S. PATENT DOCUMENTS

| 7,686,382 | B2 * | 3/2010 | Rober et al. | 296/180.1 |
| 7,717,494 | B2 * | 5/2010 | Nagahama | 296/180.5 |

OTHER PUBLICATIONS

Seung-On Kang, Jun-Ho Cho, Sang-Ook Jun, Hoon-Il Park, Ki-Sun Song, Jung-Do Kee; Kyu-Hong Kim, Dong-Ho Lee; "A Study of an Active Rear Diffuser Device for Aerodynamic Drag Reduction of Automobiles"; SAE International; 2012-01-0173; published Apr. 16, 2012.

* cited by examiner

*Primary Examiner* — Joseph D Pape
*Assistant Examiner* — Dana Ivey
(74) *Attorney, Agent, or Firm* — Quinn Law Group, PLLC

(57) ABSTRACT

A vehicle includes a vehicle body having a first body end configured to face oncoming ambient airflow when the vehicle is in motion relative to a road surface, and also having a second body end opposite of the first body end. The vehicle also includes an underbody portion configured to span a distance between the first and second body ends and define a space between the vehicle body and the road surface. The vehicle additionally includes an active diffuser assembly disposed at the second end and configured to control the airflow past the underbody portion through the space between the vehicle body and the road surface and out to the ambient. The active diffuser assembly includes a panel configured to selectively extend into and retract from the ambient airflow aft of the second end. The active diffuser assembly also includes a first device configured to extend the panel.

20 Claims, 4 Drawing Sheets

ACTIVE AERO DIFFUSER

TECHNICAL FIELD

The invention relates to an active aero diffuser for a motor vehicle.

BACKGROUND

A diffuser, in an automotive context, is a shaped section of the vehicle underbody which improves the vehicle's aerodynamic properties by enhancing transition between high-velocity airflow underneath the car and the significantly slower free-stream airflow of the ambient atmosphere. The diffuser generally affects pressure under the vehicle body as the vehicle moves through the air to increase effective downforce on the vehicle.

The diffuser is typically located at the aft part of a vehicle underbody and works by accelerating the velocity of the airflow underneath the vehicle. The diffuser works by providing a space for the underbody airflow to decelerate and expand into an area covered by the vehicle while air density remains constant. Specifically, the diffuser uses Bernoulli's principle, according to which fluid pressure decreases as velocity of the fluid increases. Therefore, the diffuser causes the pressure below the vehicle to be lower than on the side and above the vehicle, thereby generating a measure of downforce.

When a diffuser is used, the air flows into the underbody from the front and sides of the vehicle, following which the air accelerates and reduces pressure under the vehicle. A suction peak is generated at the transition from the underbody to the diffuser. The diffuser then eases the high velocity underbody air back to the velocity of the free-stream airflow moving past the vehicle and also helps fill in the wake area immediately behind the vehicle. As a result, the diffuser reduces drag and increases downforce on the vehicle by making the whole vehicle underbody a more efficient downforce producing device. Additionally, the diffuser imparts upward momentum to the air aft of the vehicle, which further increases downforce on the vehicle.

SUMMARY

A vehicle includes a vehicle body having a first body end configured to face oncoming ambient airflow when the vehicle is in motion relative to a road surface, and also having a second body end opposite of the first body end. The vehicle also includes an underbody portion configured to span a distance between the first and second body ends and define a space between the vehicle body and the road surface. The vehicle additionally includes an active diffuser assembly disposed at the second body end and configured to control the airflow past the underbody portion through the space between the vehicle body and the road surface and out to the ambient. The active diffuser assembly includes a panel configured to selectively extend into and retract from the ambient airflow aft, i.e., to the rear, of the second end. The active diffuser assembly also includes a first device configured to extend the panel.

The first device may be configured to additionally retract the panel. In such a case, the first device may be a linear actuator.

The first device may be configured to extend the panel above a predetermined velocity of the vehicle and also a predetermined distance past the second body end.

The first device may include a flap having a surface disposed substantially orthogonal to the panel. The flap may be secured to the panel and configured to receive a force from the airflow to extend the panel.

The surface of the flap may be sized such that the panel is deployed above the predetermined vehicle velocity.

Additionally, the flap may include a plurality of individual flaps.

The vehicle may also include a second device configured to selectively retract the panel.

The second device may be configured to retract the panel below a predetermined velocity of the vehicle.

The second device may include a spring element having a first spring end secured to the panel and a second spring end secured to the second body end.

The vehicle may also include a channel arranged proximate to the second body end. In such a case, the active panel may be supported relative to the channel via a bearing.

The channel may be a plurality of channels, while the bearing may be at least one bearing per each of the plurality of channels.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
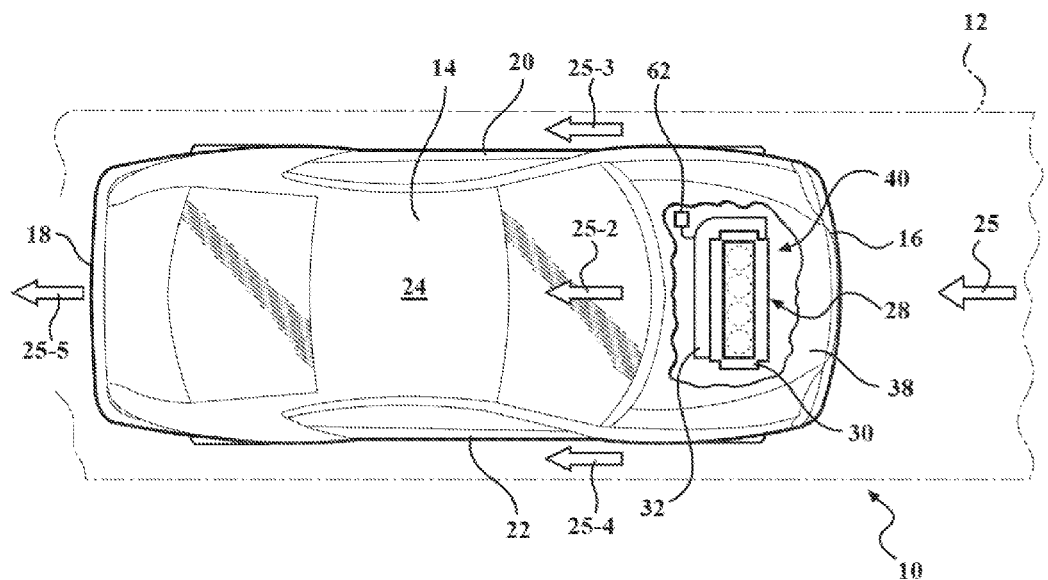
FIG. 1 is a schematic top view of a vehicle having an active diffuser assembly.

Referring to the drawings, wherein like reference numbers refer to like components, FIG. 1 shows a schematic view of a motor vehicle 10 positioned relative to a road surface 12. The vehicle 10 includes a vehicle body 14. The vehicle body 14 defines six body sides. The six body sides include a first body end or front end 16, an opposing second body end or rear end 18, a left side 20, and a right side 22, a top body portion 24, which frequently includes a vehicle roof, and an underbody portion 26 (shown in FIG. 2). As understood by those skilled in the art, the front end 16 is configured to face oncoming ambient airflow 25 when the vehicle is in motion relative to the road surface 12.

Figure 2:
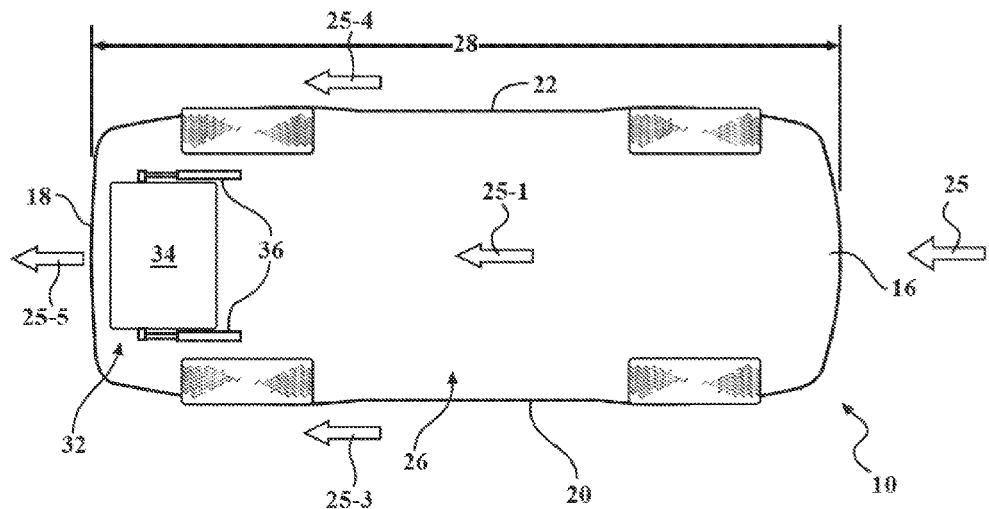
FIG. 2 is a schematic bottom view of the vehicle including the active diffuser assembly shown in FIG. 1, the diffuser assembly being disposed aft of an underbody portion of the vehicle.
Figure 5:
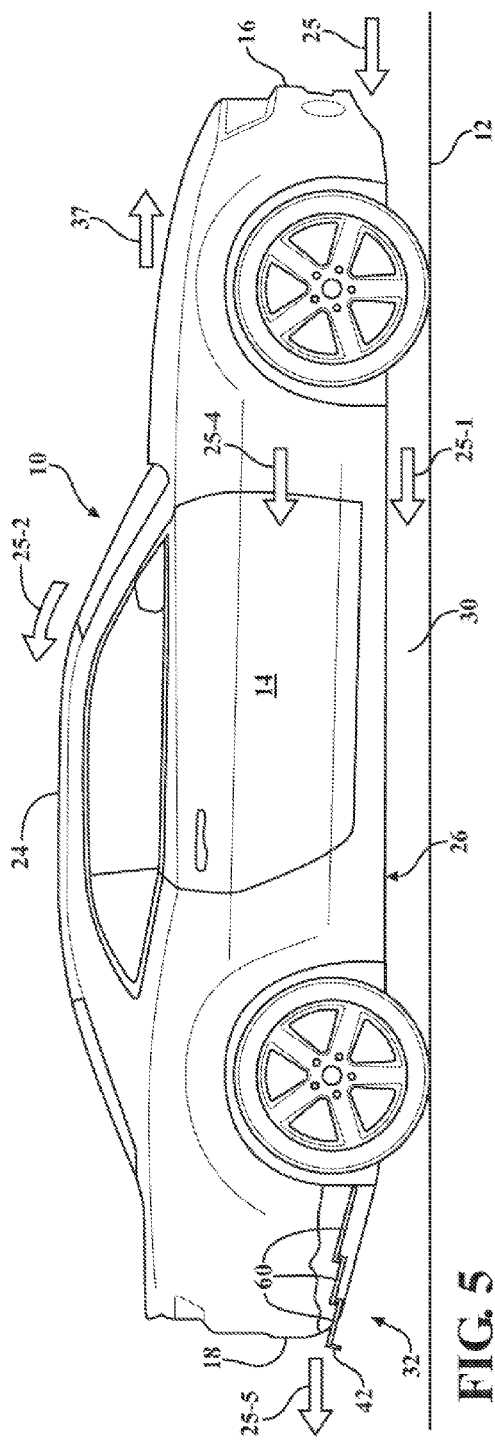
FIG. 5 is a schematic partial side view of the vehicle shown in FIGS. 1-4, with the active diffuser assembly depicted in a stowed position.
Figure 6:
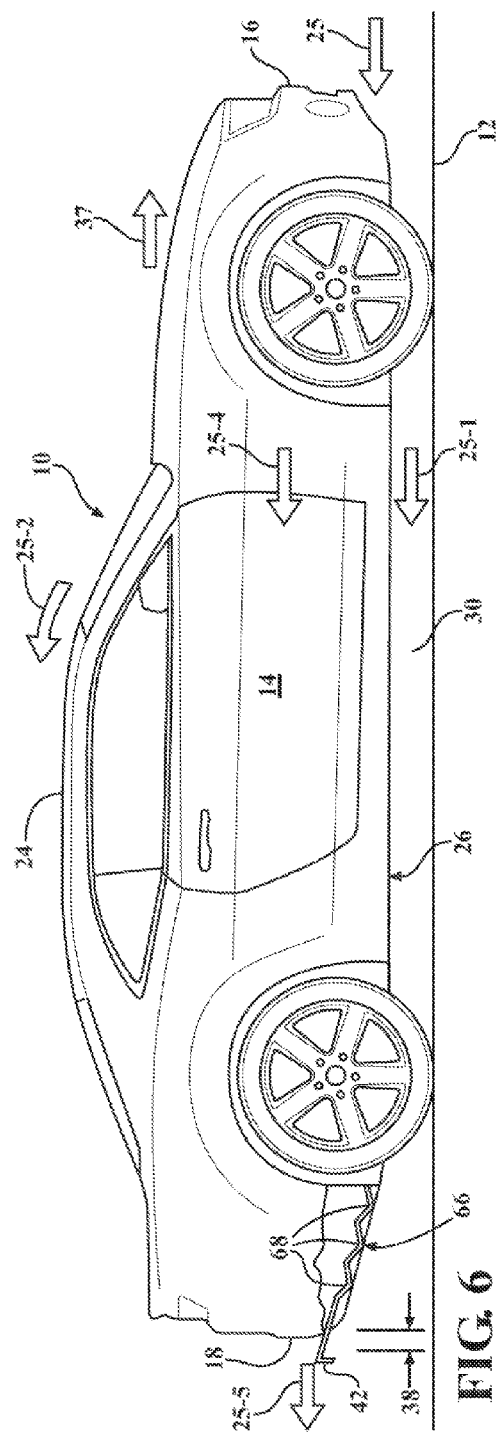
FIG. 6 is a schematic partial side view of the vehicle shown in FIGS. 1-6, with the active diffuser assembly depicted in a deployed position.

As shown in FIG. 2, the underbody portion 26 is configured to span a distance 28 between the front and rear body ends 16, 18. The underbody portion 26 may have a substantially flat surface and have components of various sub-systems, for example of an engine exhaust system and a vehicle suspension (not shown), tucked into specially configured crevices, such that a first airflow portion 25-1 may flow past the vehicle body 14 with limited disturbance. The underbody portion 26 also defines a space 30 between the vehicle body 14 and the road surface 12 (as shown in FIGS. 5-6). Accordingly, the space 30 permits the first airflow portion 25-1 to pass under the vehicle body 14, between the vehicle body 14 and the road surface 12, while a second airflow portion 25-2 passes over the top body portion 24. Furthermore, a third airflow portion 25-3 passes around the left and right sides 20, 22. The airflow portions 25-1, 25-2, and 25-3 all rejoin behind the rear end 18 in a wake area or recirculating airflow region 25-5 immediately behind the rear end 18 of the moving vehicle. As understood by those skilled in the art, the recirculating airflow region 25-5 is generally caused at elevated vehicle speeds by the flow of surrounding air around the body sides 18, 20, 22, 24, and 26.

Figure 3:
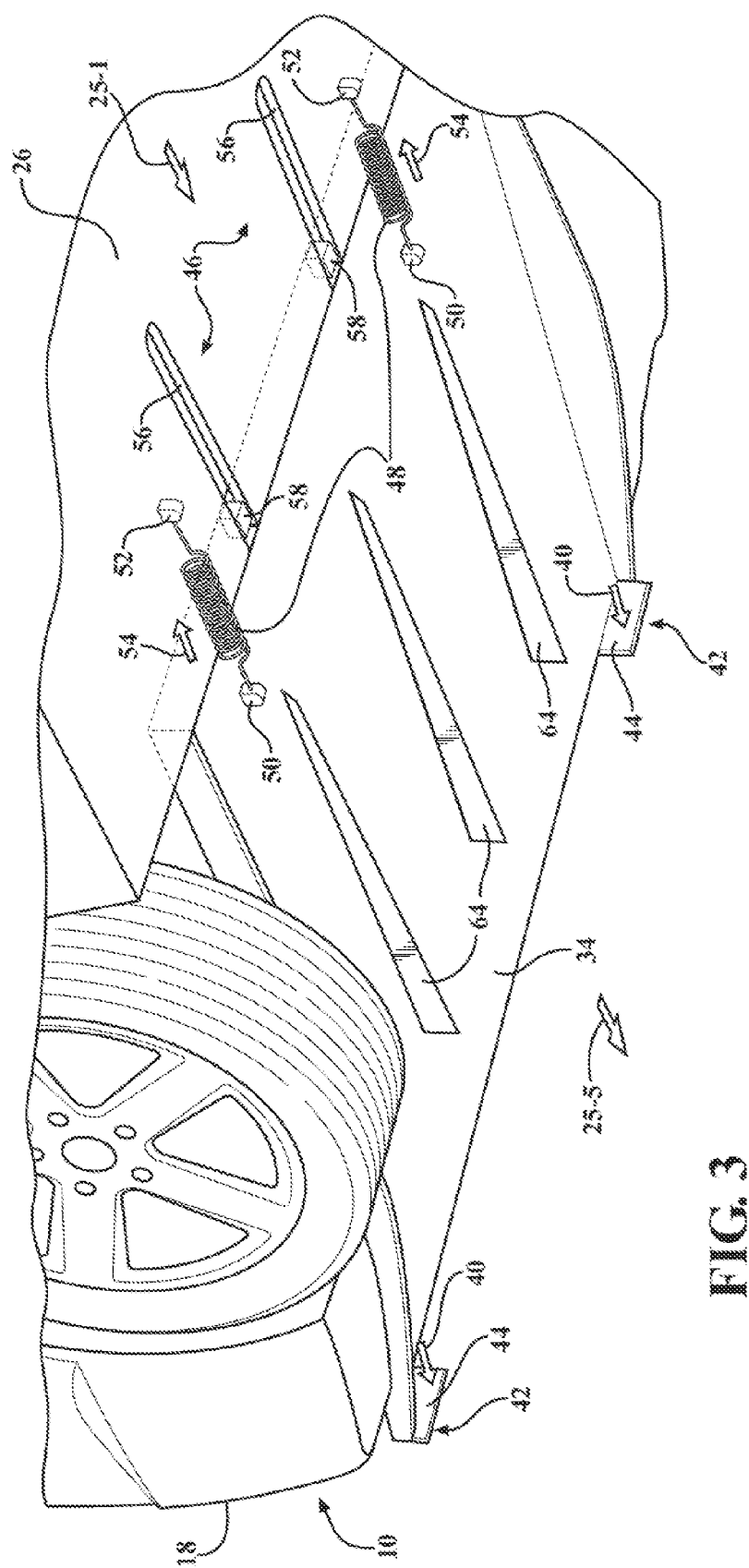
FIG. 3 is a schematic close-up partial perspective bottom view of the rear end of the vehicle having the active diffuser assembly shown in FIGS. 1 and 2 according to one embodiment.
Figure 4:
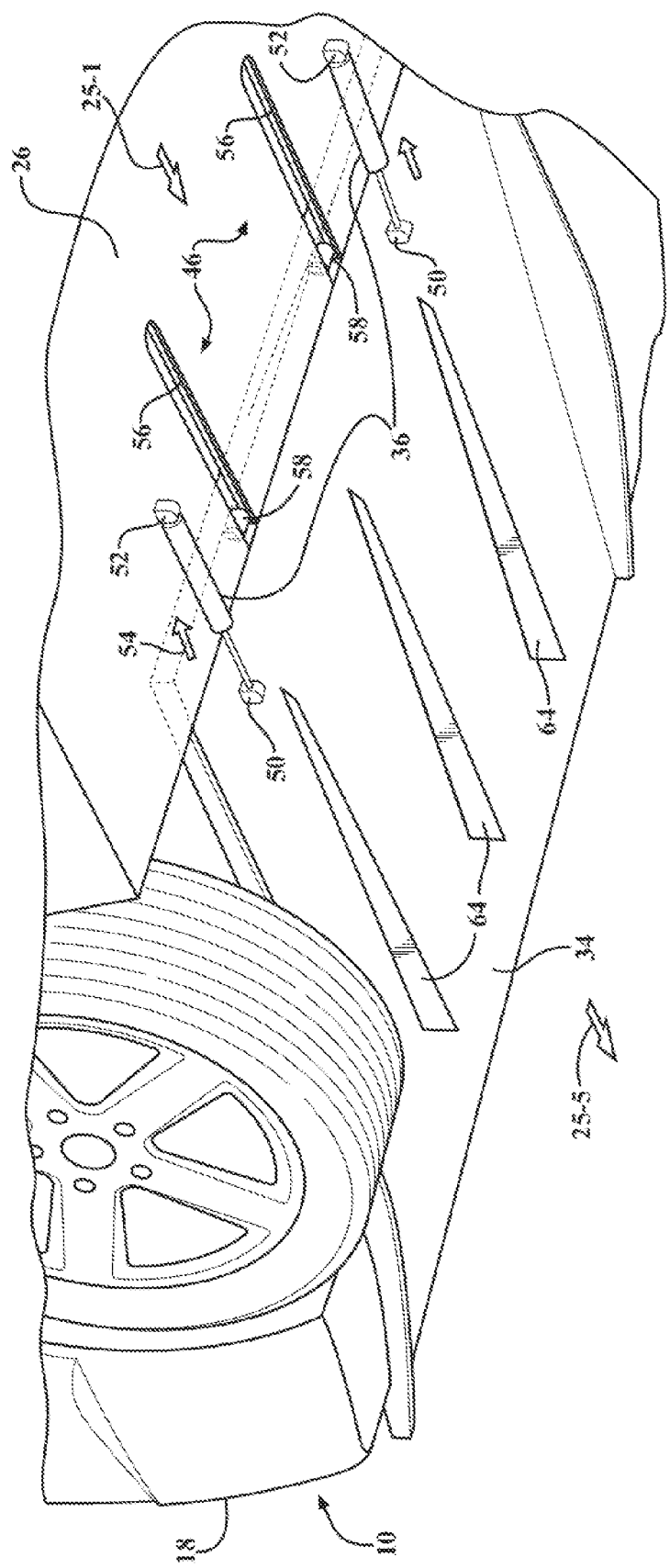
FIG. 4 is a schematic close-up partial perspective bottom view of the rear end of the vehicle having the active diffuser assembly shown in FIGS. 1 and 2 according to another embodiment.

As shown in FIGS. 2-6, the vehicle 10 also includes an active diffuser assembly 32 disposed at the rear end 18 proximate to the underbody portion 26. The active diffuser assembly 32 is configured to control the first airflow portion 25-1 past the underbody portion 26 through the space 30 and out to the ambient. The active diffuser assembly 32 includes a panel 34 configured to selectively extend into and retract from the ambient airflow 25 in the recirculating airflow region 25-5. As shown in FIGS. 2 and 3, the active diffuser assembly 32 also includes a first device 36 configured to extend the panel 34 when the vehicle 10 is in motion relative to the road surface 12. The first device 36 may be configured as an active, linearly-extending actuator (as shown in FIG. 4), which may, for example, be a fluidly actuated device, or configured as a servomotor or a solenoid. Additionally, the first device 36 may include a single actuator or a plurality of individual actuators. Such actuators may be controlled via a dedicated controller 62 or via an electronic control unit of the vehicle 10.

In the case where a plurality of individual actuators is used, the actuators may be located symmetrically along the rear end 18 in order to facilitate uniform extension and retraction of the panel 34 relative to both the left side 20 and the right side 22. The linearly-extending actuator may be a dual-action first device 36 and be configured to also retract the panel 34. The dual-action type of first device 36 may be configured to extend the panel 34 above a predetermined velocity 37 (shown in FIGS. 5-6) of the vehicle 10 and retract the panel below the same predetermined vehicle velocity 37, or some other specifically identified vehicle velocity. The predetermined vehicle velocity 37 may be selected empirically through testing in a wind tunnel or through a computational method.

At elevated vehicle speeds the extended panel 34 permits the first airflow portion 25-1 to expand in the space 30. However, expansion of the first airflow portion 25-1 by the diffuser assembly 32 while the panel 34 is extended does not cause excessive airflow separation or drag on the vehicle body 14. On the contrary, such extension of the panel 34 enhances the aerodynamic profile of the vehicle body 14 by providing a degree of "wake infill", i.e., filling of the recirculating airflow region 25-5 immediately behind the moving vehicle. Furthermore, the active diffuser assembly 32 causes the flow of the air upstream of the panel 34 to accelerate through the underbody portion 26, thus generating a downforce and an attendant drag reduction on the vehicle body 14.

The predetermined vehicle velocity 37 determined by any of the appropriate methods may identify the speed of vehicle 10 above which an enhanced aerodynamic profile of the vehicle body 14 imparts a desired benefit to vehicle efficiency. The enhanced aerodynamic profile of the vehicle body 14 may provide a benefit with respect to fuel economy in a vehicle powered by an internal combustion engine (not shown) and/or with respect to the noise level being perceived by the occupants of vehicle 10. Additionally, the dual-action type of first device 36 may be configured to extend the panel 34 for a predetermined distance 38 past the rear end 18 such that the extension of the panel provides the desired aerodynamic benefit, i.e., drag reduction on the vehicle body 14.

As shown in FIG. 3, the first device 36 may be configured as a passive actuator and include a number of flaps 42. Although two individual flaps 42 are shown, fewer or greater number of such flaps may be included as required to achieve the extension of panel 34. As shown, each flap 42 is secured to the panel 34 and configured to receive a force 40 generated by the first airflow portion 25-1 and thereby extend the panel away from the rear end 18. Each flap 42 includes a surface 44 that is substantially orthogonal to the plane of the panel 34, e.g., within +/−5 degrees. The surface 44 of each flap 42 is sized such that the panel 34 may be deployed above a predetermined velocity of the vehicle 10 by the force 40. The panel 34 may be formed from a suitably rigid but low mass material, such as an engineered plastic or aluminum. Furthermore, each flap 42 may be incorporated into, and be part of the panel 34, thus forming a unitary, monolithic structure with the panel. Similar to the dual-action type of first device 36, the flaps 42 may be configured to extend the panel 34 for the predetermined distance 38 past the rear end 18.

The vehicle 10 may also include a second device 48 configured to selectively retract the panel 34. As shown in FIG. 3, the second device 48 may include a number of spring elements. Although two individual spring elements are shown, fewer or greater number of such spring elements may be included to achieve the desired retraction of panel 34. Each spring element includes a first spring end 50 secured to the panel 34 and a second spring end 52 secured to the rear end 18. The second device 48 may be configured to retract the panel 34 below the predetermined vehicle velocity 37 or some other predetermined velocity of the vehicle 10. In other words, the second device 48 may be arranged to extend with the panel 34 and thus exert a force 54 on the panel that is opposite the force 40. Accordingly, when the speed of vehicle 10 drops below the predetermined vehicle velocity 37, the force 54 overcomes the force 40 and the second device 48 retracts the panel 34.

The vehicle 10 may additionally include channels 56 arranged proximate to the second body end 18 on the underbody portion 26 (as shown in FIG. 3), or incorporated into the rear end itself. As may be seen in FIG. 3, the panel 34 may be supported relative to the channel 56 via a number of bearings 58. Bearings 58 may be configured as ball or roller bearing type. At least one bearing 58 may be used to support the panel 34 with respect to each of the channels 56. Bearings 58 are intended to facilitate reduced friction during the extension and retraction of the panel 34 and permit controlled and predictable operation of the panel at the predetermined vehicle velocity 37 and over the predetermined distance 38.

As shown in FIG. 5, the panel 34 may be constructed from a number of interconnected sections 60. The sections 60 may overlap such that a section above substantially extends over the section immediately below when the panel 34 is retracted and overlap only partially when the panel is extended. The panel 34 may include a curved, i.e., either concave or convex, shape. Such a curved shape may be configured to stiffen and stabilize the panel 34 when subjected to the force 40 generated by the first airflow portion 25-1. As a result of the subject curved shape, bending of the panel 34 due to a force from the first airflow portion 25-1 and or the second airflow portion 25-2, as when the vehicle 10 is traveling at elevated speeds, may be minimized. Additionally, as shown in FIGS. 3 and 4, the panel 34 may include vertical sections or fins 64 disposed at specific intervals and configured to channel and streamline the first airflow portion 25-1.

As shown in FIG. 6, the panel 34 may be characterized by a monolithic or single-piece accordion type of construction and include a pleated section 66. Such construction may be generated via a plastic molding process so that each individual pleat includes a living hinge 68. The living hinges 68 may be molded in the retracted state, such that the extendable portion 46 is constantly urged to a stowed position via force 54, as shown in FIG. 3. Hence, energy may be stored in the living hinges 68 and used to pre-position or bias position of the panel 34. Furthermore, when the speed of vehicle 10 drops below the predetermined vehicle velocity 37, the force 54 would overcome the force 40 and the living hinges 68 would retract the panel 34.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
a vehicle body having a first body end configured to face oncoming ambient airflow when the vehicle is in motion relative to a road surface, and also having a second body end opposite of the first body end;
an underbody portion configured to span a distance between the first and second body ends and define a space between the vehicle body and the road surface; and
an active diffuser assembly disposed at the second end and configured to control the ambient airflow past the underbody portion through the space between the vehicle body and the road surface the active diffuser assembly including:
  a panel configured to selectively extend out of the vehicle body past the second body end into a wake area when the vehicle is in motion and retract into the vehicle body; and
  a first device configured to extend the panel into the wake area.

2. The vehicle of claim 1, wherein the first device is configured to additionally retract the panel.

3. The vehicle of claim 2, wherein the first device is a linear actuator.

4. The vehicle of claim 1, wherein the first device is configured to extend the panel into the wake area above a predetermined velocity of the vehicle.

5. The vehicle of claim 1, wherein the first device is configured to extend the panel into the wake area for a predetermined distance past the second body end.

6. The vehicle of claim 4, wherein the first device includes at least one flap having a surface disposed substantially orthogonal to the panel, and wherein the flap is secured to the panel and configured to receive a force from the airflow to extend the panel.

7. The vehicle of claim 6, wherein the surface of the at least one flap is defined by a surface area that receives the force from the airflow such that the panel is deployed above the predetermined vehicle velocity.

8. The vehicle of claim 6, wherein the at least one flap includes a plurality of individual flaps.

9. The vehicle of claim 1, further comprising a second device configured to selectively retract the panel into the vehicle body.

10. The vehicle of claim 9, wherein the second device is configured to retract the panel below a predetermined velocity of the vehicle.

11. The vehicle of claim 9, wherein the second device includes a spring element having a first spring end secured to the panel and a second spring end secured to the second body end.

12. The vehicle of claim 1, further comprising at least one channel arranged proximate to the second body end, wherein the panel is supported relative to the at least one channel via a bearing.

13. The vehicle of claim 12, wherein the at least one channel is a plurality of channels and the bearing is at least one bearing per each of the plurality of channels.

14. A vehicle comprising:
a vehicle body having a first body end configured to face oncoming ambient airflow when the vehicle is in motion relative to a road surface, and also having a second body end opposite of the first body end;
an underbody portion configured to span a distance between the first and second body ends and define a space between the vehicle body and the road surface; and
an active diffuser assembly disposed at the second end and configured to control the ambient airflow past the underbody portion through the space between the vehicle body and the road surface the active diffuser assembly including:
  a panel configured to selectively extend out of the vehicle body past the second body end into a wake area when the vehicle is in motion and retract into the vehicle body;
  a first device configured to extend the panel into the wake area above a predetermined velocity of the vehicle for a predetermined distance past the second body end; and
  a second device configured to selectively retract the panel into the vehicle body below the predetermined velocity of the vehicle.

15. The vehicle of claim 14, wherein the first device includes at least one flap having a surface disposed substantially orthogonal to the panel, and wherein the at least one flap is secured to the panel and configured to receive a force from the airflow to extend the panel.

16. The vehicle of claim 15, wherein the surface of the at least one flap is defined by a surface area that receives the force from the airflow such that the panel is deployed above the predetermined vehicle velocity.

17. The vehicle of claim 15, wherein the at least one flap includes a plurality of individual flaps.

18. The vehicle of claim 16, wherein the second device includes a spring element having a first spring end secured to the panel and a second spring end secured to the second body end.

19. The vehicle of claim 14, further comprising at least one channel arranged proximate to the second body end, wherein the panel is supported relative to the at least one channel via a bearing.

20. The vehicle of claim 19, wherein the at least one channel is a plurality of channels and the bearing is at least one bearing per each of the plurality of channels.

\* \* \* \* \*